United States Patent
Knee

(10) Patent No.: US 7,164,715 B2
(45) Date of Patent: Jan. 16, 2007

(54) VIDEO COMPRESSION

(75) Inventor: Michael James Knee, Hampshire (GB)

(73) Assignee: Snell & Wilcox Limited, Middlesex (GB)

(*) Notice: Subject to any disclaimer, the term of this patent is extended or adjusted under 35 U.S.C. 154(b) by 323 days.

(21) Appl. No.: 10/343,081

(22) PCT Filed: Jul. 27, 2001

(86) PCT No.: PCT/GB01/03402

§ 371 (c)(1),
(2), (4) Date: Oct. 23, 2003

(87) PCT Pub. No.: WO02/11453

PCT Pub. Date: Feb. 7, 2002

(65) Prior Publication Data
US 2004/0179590 A1 Sep. 16, 2004

(30) Foreign Application Priority Data
Jul. 28, 2000 (GB) ................ 0018628.8

(51) Int. Cl.
H04B 1/66 (2006.01)
H04N 7/12 (2006.01)

(52) U.S. Cl. ............................. 375/240.01

(58) Field of Classification Search ............ None
See application file for complete search history.

(56) References Cited

U.S. PATENT DOCUMENTS

| 5,592,226 | A | 1/1997 | Lee et al. | |
| 5,774,593 | A | 6/1998 | Zick et al. | |
| 6,057,893 | A | 5/2000 | Kojima et al. | |
| 6,714,594 | B1 * | 3/2004 | Dimitrova et al. | 375/240.16 |
| 6,731,684 | B1 * | 5/2004 | Wu | 375/240.12 |
| 6,804,301 | B1 * | 10/2004 | Wu et al. | 375/240.12 |
| 2001/0014121 | A1 * | 8/2001 | Kaye et al. | 375/240.03 |

FOREIGN PATENT DOCUMENTS

| WO | WO 95/24095 | 9/1995 |
| WO | WO 00/19726 | 4/2000 |

* cited by examiner

Primary Examiner—Nhon Diep
(74) Attorney, Agent, or Firm—Hodgson Russ LLP

(57) ABSTRACT

In compression coding of picture sequences, a measure of picture difference is generated and compared with a picture difference threshold. The comparison is used in selecting between the use of predicted (P-pictures) and non-predicted has an initial value adapted to promote the use of an I-picture at or close to a scene change in the picture sequence, and changes in time in such a manner as to increase the probability of selection of a I-picture with an increase in the time since selection of the last I-picture.

6 Claims, 2 Drawing Sheets

IBBPBBPBBPBBPBBPBBP..........

Figure 1

IBBPBBPBB|
           |IBBPBBPBBP..........

Figure 2

IBBPBBPB|
          |BIBBPBBPBBP..........

Figure 3

VIDEO COMPRESSION

This invention relates to video compression techniques and in one example, to MPEG2.

It is well understood that the selection of an appropriate group of pictures (GOP) structure is important to achieving quality encoding at a given bit rate. At lower bit rates it will generally be necessary to employ relatively large numbers of predicted (P and B) pictures and a relatively small number of Intra-coded (I) pictures. There are, however, lower limits upon the number of I-pictures, dictated in different applications by requirements to contain drift and the promulgation of errors and to ensure an acceptable lock-on period when switching to a particular bitsteam. An additional factor lies in the visibility of the GOP structure, particularly at low bit rates. Thus the introduction of an I-picture, dictated by the requirements that have been mentioned, can itself represent an artefact in a generally quiet picture sequence.

It is an object of this invention to address these apparently conflicting is requirements.

Accordingly, the present invention consists in one aspect in a method of compression coding a sequence of pictures, the method comprising the steps of generating a measure of picture difference; comparing said measure with a picture difference threshold; and utilising this comparison in selecting between the use of predicted and non-predicted compressed pictures (I-pictures), wherein the threshold has an initial value adapted to promote the use of an I-picture at or close to a scene change in the picture sequence, the threshold changing in time in such a manner as to increase the probability of selection of a I-picture with an increase in the time since selection of the last I-picture.

In a further aspect, the invention consists in apparatus for compression coding of a sequence of pictures, comprising measuring means for generating a measure of picture difference; generator means for generating a picture difference threshold; comparator means for comparing said measure with the picture difference threshold; and adaption means for utilising this comparison in selecting between the use of predicted and non-predicted compressed pictures (I-pictures), the generator means capable of adapting the picture difference threshold to have an initial value which promotes the use of an I-picture at or close to a scene change in the picture sequence; and changing in time the threshold in such a manner as to increase the probability of selection of a I-picture with an increase in the time since selection of the last I-picture.

In this way it can be arranged that with relatively frequent scene changes, every I-picture is located at or close to a scene change. This has the advantages of improved coding efficiency since predictive coding will be inefficient across a scene change, and of low visibility of the compressed picture structure, since any noticeable difference in character between predicted and non-predicted compressed pictures will be masked by the scene change.

Where the interval between scene changes is large, and it becomes desirable to select an I-picture within a scene, the change in threshold according to this invention will promote the selection of an I-picture at a discontinuity in the picture sequence, such as the movement into shot of a large object. As the time since the last I-picture increases, the amount of discontinuity necessary to provoke the selection of an I-picture will progressively reduce.

In one embodiment, the threshold reduces linearly from a value which is expected to be achieved only by a "true" scene change, to a value at which a the selection of an I-picture is inevitable, irrespective of picture content. The period of this threshold variation might typically be 120 fields or 2 seconds. A different period could of course be chosen and the threshold variation may be non-linear.

The location of an I-picture at a discontinuity will of course provide the same advantages as location at a scene change, to a degree dependent upon the amount of the discontinuity.

The measure of picture difference can take a wide variety of forms, it can operate in the video domain and take the form of an accumulated sum of pixel by pixel differences. More complex methods for detecting scene changes are known and can be applied in accordance with this invention, for example through modification of the threshold for scene change identification. Reference is for example directed to EP-A-0 748 560 which describes methods for detecting scene changes or cuts, utilising a lack of correlation between successive pictures rather than an arithmetical picture difference.

It will also be possible to provide a measure of picture difference in the MPEG domain, utilising the amount of the prediction error.

The invention will now be described by way of example with reference to the accompanying drawings, in which:

FIG. 1 is a diagram illustrating a typical GOP structure;

FIGS. 2 and 3 are diagrams illustrating GOP structures according to embodiments of the invention.

Figure 4:
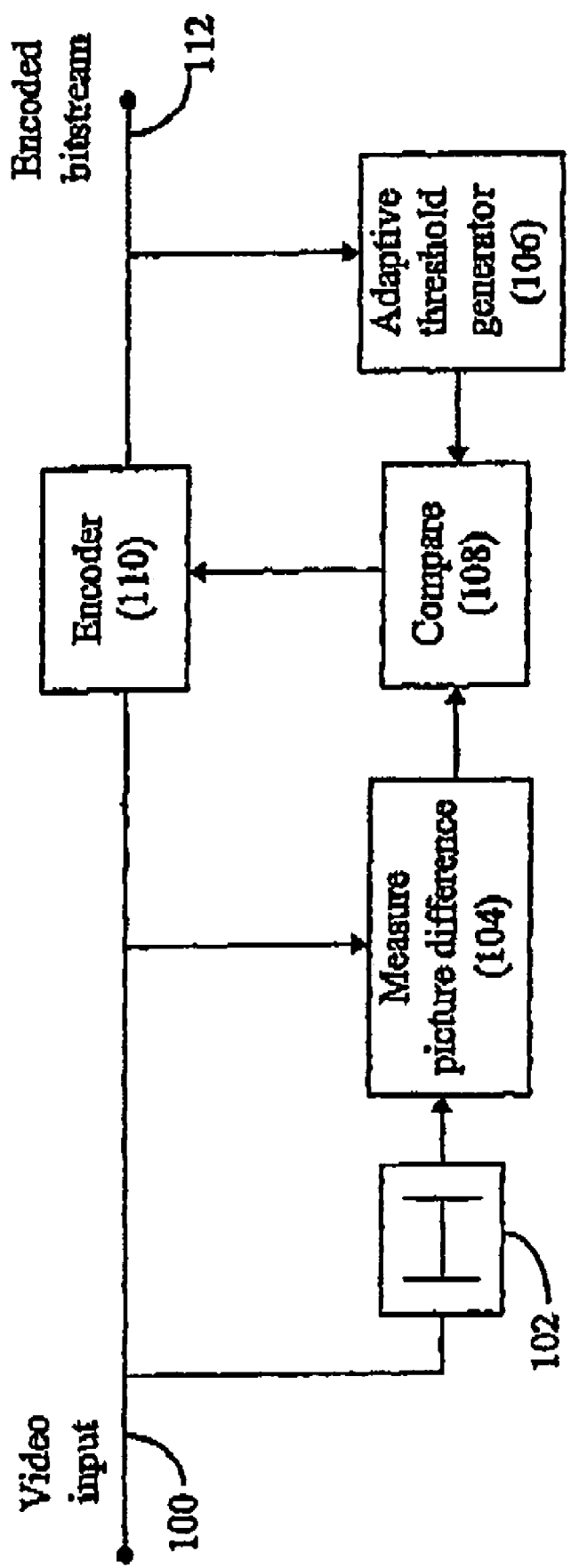
FIG. 4 is a diagram illustrating a compression coding apparatus according to an embodiment of the invention.

In a lower bit ram MPEG2 encoder, it is useful to employ a GOP structure such as that shown in FIG. 1. The choice of two bidirectionally predicted B-pictures, between unidirectionally predicted P-pictures, is typical but other numbers can of course be employed.

At a discontinuity which exceeds the current threshold value (signified in 30 FIG. 2 by a vertical line), the use of an I-picture is forced. That is to say the P-picture that would otherwise be employed, is replaced by an I-picture.

There are advantages in the pattern of B- and P-pictures remaining generally constant. The number (here two) of successive B-pictures determines the amount of delay required to accommodate the re-ordering of pictures, necessary to ensure that each B-picture arrives after both of the two pictures from which it is predicted. Changes in the number of successive B-pictures are therefore not desirable.

In consequence, if a discontinuity which exceeds the current threshold value occurs immediately before a B-picture, selection of an I-picture is deferred until the next location at which a P-picture would otherwise have been sent. This is illustrated in FIG. 3.

In an embodiment, the apparatus illustrated in FIG. 4 may be used to employ the techniques described above. The video input (100) is passed to a delay (102) and block 104, which receives the delayed signal and measures the difference between successive pictures. The picture difference is then compared (108) with the threshold, and this comparison is employed in controlling the encoder (110), in order that I-pictures are inserted into the bitstream at scene changes. The adaptive threshold generator (106) keeps track of the latest instance of an I-picture in the output bitstream, and produces a threshold having a decay related to time passed since the last I-picture. The threshold is then passed to block 108 for the comparison.

It will be understood that this invention has been described by way of example only and that a wide variety of further modifications are possible without departing from the scope of the invention. For example, the invention extends to a computer program or computer program product for carrying out any of the methods described herein.

The invention claimed is:

1. A method of compression coding a sequence of pictures, the method comprising the steps of generating a measure of picture difference; comparing said measure with a picture difference threshold; and utilizing this comparison in selecting between the use of predicted and non-predicted compressed pictures (I-pictures), wherein the threshold has an initial value to promote the use of an I-picture at or close to a scene change in the picture sequence, the threshold changing in time in order to increase the probability of selection of an I-picture with an increase in the time since selection of the last I-picture.

2. Apparatus for compression coding of a sequence of pictures, comprising a measuring circuit for generating a measure of picture difference; a generator for generating a picture difference threshold; a comparator for comparing said measure with the picture difference threshold; and an adaptor for utilizing this comparison in selecting between the use of predicted and non-predicted compressed pictures (I-pictures), the generator: adapting the picture difference threshold to have an initial value which promotes the use of an I-picture at or close to a scene change in the picture sequence; and changing in time the threshold in order to increase the probability of selection of an I-picture with an increase in the time since selection of the last I-picture.

3. A method as claimed in claim 1 wherein the threshold varies periodically.

4. A method as claimed in claim 3 wherein the period of threshold variation is around 120 fields.

5. A method as claimed in claim 1 wherein the threshold changes from a first scene-change value to a second value in which the selection of a non-predicted compressed picture is inevitable.

6. A method as claimed in claim 1 wherein the threshold varies linearly.

* * * * *